United States Patent
Gailloux et al.

(10) Patent No.: US 9,147,187 B1
(45) Date of Patent: Sep. 29, 2015

(54) STORING AND ACCESSING A PLURALITY OF PAYMENT OPTIONS ON A SECURE ELEMENT

(71) Applicant: Sprint Communications Company L.P., Overland Park, KS (US)

(72) Inventors: Michael A. Gailloux, Overland Park, KS (US); Lauren Ricardo St. Aubyn King, Somerset, NJ (US)

(73) Assignee: Sprint Communications Company L.P., Overland Park, KS (US)

( * ) Notice: Subject to any disclaimer, the term of this patent is extended or adjusted under 35 U.S.C. 154(b) by 50 days.

(21) Appl. No.: 13/737,604

(22) Filed: Jan. 9, 2013

(51) Int. Cl.
*G06Q 20/00* (2012.01)
*G06Q 20/32* (2012.01)

(52) U.S. Cl.
CPC .................. *G06Q 20/3278* (2013.01)

(58) Field of Classification Search
None
See application file for complete search history.

(56) References Cited

U.S. PATENT DOCUMENTS

| | | | |
|---|---|---|---|
| 6,542,872 B1 | 4/2003 | Skubic et al. | |
| 8,196,131 B1 * | 6/2012 | von Behren et al. | 717/168 |
| 8,615,457 B2 * | 12/2013 | Mullen et al. | 705/35 |
| 2003/0028481 A1 * | 2/2003 | Flitcroft et al. | 705/39 |
| 2003/0208637 A1 * | 11/2003 | Hayduk | 709/320 |
| 2008/0081609 A1 * | 4/2008 | Burgan et al. | 455/425 |

* cited by examiner

*Primary Examiner* — Paul Danneman (57) ABSTRACT

Methods and systems for storing a plurality of payment options on a secure element in a portable electronic device and associating at least one payment option with a third party application to make a payment transaction.

20 Claims, 7 Drawing Sheets

STORING AND ACCESSING A PLURALITY OF PAYMENT OPTIONS ON A SECURE ELEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Portable electronic devices may be used to complete financial transactions. Payment methods may be stored on a secure element on the portable electronic device and accessed by the telecommunications provider and a financial institution in order to process a payment. Various sets of standards are used for portable electronic devices to establish radio communication with each other. One of these sets of standards is Near Field Communication (NFC) where radio communication may be established between portable electronic devices by putting the devices in contact or in close proximity. However, a telecommunications provider or a user, or both, may not want all of the information on a portable electronic device to be exchanged. As such, some information may be stored on a secure element on the portable electronic device which may be protected and unable to be accessed through NFC without the party accessing the secure element providing additional credentials.

SUMMARY

In an embodiment, a method of using a portable electronic device to make a payment by near field communication using a selected payment option, comprising: installing a third party application on a portable electronic device in a user memory partition; sending a request to associate the third party application with a selected payment option to an application layer of the portable electronic device; and comparing, by the application layer, a category of the third party application to a plurality of use restrictions defined by an issuer of the selected payment option, wherein the plurality of use restrictions comprise a category of a transaction. The embodiment further comprising determining, by the application layer, based on the comparison, that the category of the third party application meets the plurality of use restrictions; receiving, by the application layer, a selection of a payment option from the third party application based on a determination that the category of the third party application meets the plurality of use restrictions; and associating, by the application layer, the third party application to the selected payment option wherein the third party application executes after the association has been established and after the selected payment option is configured by the application layer as a default payment option for the third party application, wherein the default payment option is used to make a payment when the portable electronic device is presented to a point-of-sale terminal, and wherein the payment is made by a near-field-communication payment transaction triggered by the portable electronic device.

In an embodiment, a portable electronic device comprising: a near field communication transmitter; a first non-transitory memory comprising a secure element storing a plurality of payment options; a second non-transitory memory; a processor; and a third party application stored in a user partition of the second non-transitory memory. The embodiment further comprising a secure element integration layer application stored in the second non-transitory memory that, when executed by the processor: receives a request for integration with a payment option from the third party application; identifies at least one payment option stored in the secure element of the first non-transitory memory that is authorized for use with a business category associated with the third party application; provides the at least one payment option to the third party application in response to the request for integration; receives a selection of one payment option of the at least payment card; and integrates the third party application with the one payment option, where integration comprises storing an association between the one payment option and the third party application.

In an alternate embodiment, a method of selecting from multiple payment options stored on a portable electronic device comprising: storing, in a secure element on a portable electronic device, a plurality of payment options associated with a plurality of providers, wherein storing comprises an issuer of a payment option of the plurality of payment options sending a set of temporary credentials through an application layer in response to a request to add a payment option to the secure element; installing, on the portable electronic device, a third party application, retrieving, in response to receiving a payment trigger, at least one of the most recently used payment option and a default payment option; and wherein one of the most recently used payment option and default payment option is used to make a payment, and wherein the payment is made by a near-field-communication payment transaction triggered by the portable electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Portable electronic devices such as laptop computers, personal digital assistants (PDAs), tablets, media players, and cell phones are increasingly used by consumers for e-commerce transactions. These transactions may include in-person purchases at the vendor's location, remote purchases made from the portable electronic device using a third party application, and subscription or other repeated payments. Some cell phones contain a secure element that may hold information such as a credit card, debit card, or other account number such as a savings or checking account. In order to successfully deploy payments from a portable electronic device, a Trusted Service Manager (TSM) as indicated at block 220 in FIG. 2 may be used to help a telecommunications service provider securely distribute and manage contactless transactions for their customers. The TSM does not have an active role as a participant in the transaction but rather may have responsibilities including managing the lifecycle of applications that allow payment, ensuring security during all parts of a payment transaction, new user enrollment, activation of services, and deactivation of services. There may be four parties actually involved in the transaction: the telecommunications provider, the customer, the financial institution (first party), and a vendor (third party). The telecommunications provider controls the secure element and issues a set of electronic "keys" in the form of temporary credentials to a first party so that a consumer can set up a payment option and store the payment information on the secure element. However, once the information is stored, the telecommunications provider, and presumably the financial institution that may assume fraud losses, may not want other parties having direct access to the secure element in order to make or receive payment. However, by forming a direct partnership between the telecommunications provider and the third party, the telecommunications provider may collect a fee based on the number of portable electronic devices that use the service (flat fee), per transaction made with the portable electronic device, or may take a percentage of the earnings of the third party from the application. The third party, who may have designed a third party application for payment at point-of-sale (POS) devices as well as home use or subscriber use, may be vetted to ensure that access to the application is restricted so that only the customer, and not other applications on or functions of the phone, is able to access the third party application for payment.

In one example, a user is shopping at a vendor, for example, a department store. The user launches the third party application on their portable electronic device when they are ready to pay, or, in the alternative, it may be launched by the user prior to payment, or automatically when the user enters the store or nears a particular area where they can pay for goods or services. Upon receiving a request for payment and a selection of a payment option, the third party application sends a request to an application layer of the portable electronic device to access the secure element, and the third party application is asked for a credential. The application layer is a sort of gatekeeper that compares the third party application making the request to a plurality of use restrictions defined by the issuer of the selected payment option. The plurality of use restrictions may be stored on the secure element or externally and is defined by each issuer of a payment method and may be for all payment options issued by that issuer or there may be a separate set of use restrictions for debit cards, pre-paid cards, credit cards, checking accounts, and savings accounts.

In an embodiment, the application layer isolates the secure element and a near field communication transceiver from third party applications, thereby assuring that such third party applications cannot invoke functions or perform actions on the secure element or via the near field communication transceiver that are fraudulent and/or disallowed for security reasons. In an embodiment, the application layer further provides a structure for a trusted service manager to disassociate their payment option, for example a major credit card, from being associated with some third party applications that may be thought to reflect negatively on the trusted service manager and/or their payment option.

There may be an agreement between the third party application owner and/or an issuer of payment options wherein the telecommunications provider is paid per use of the service, or by the number of portable electronic devices using the service. Alternatively, the agreement could be directed towards a periodic payment system. Payments may be made from the third party application owner to the issuer of a selected payment option, or from the issuer to the telecommunications provider.

Figure 1:
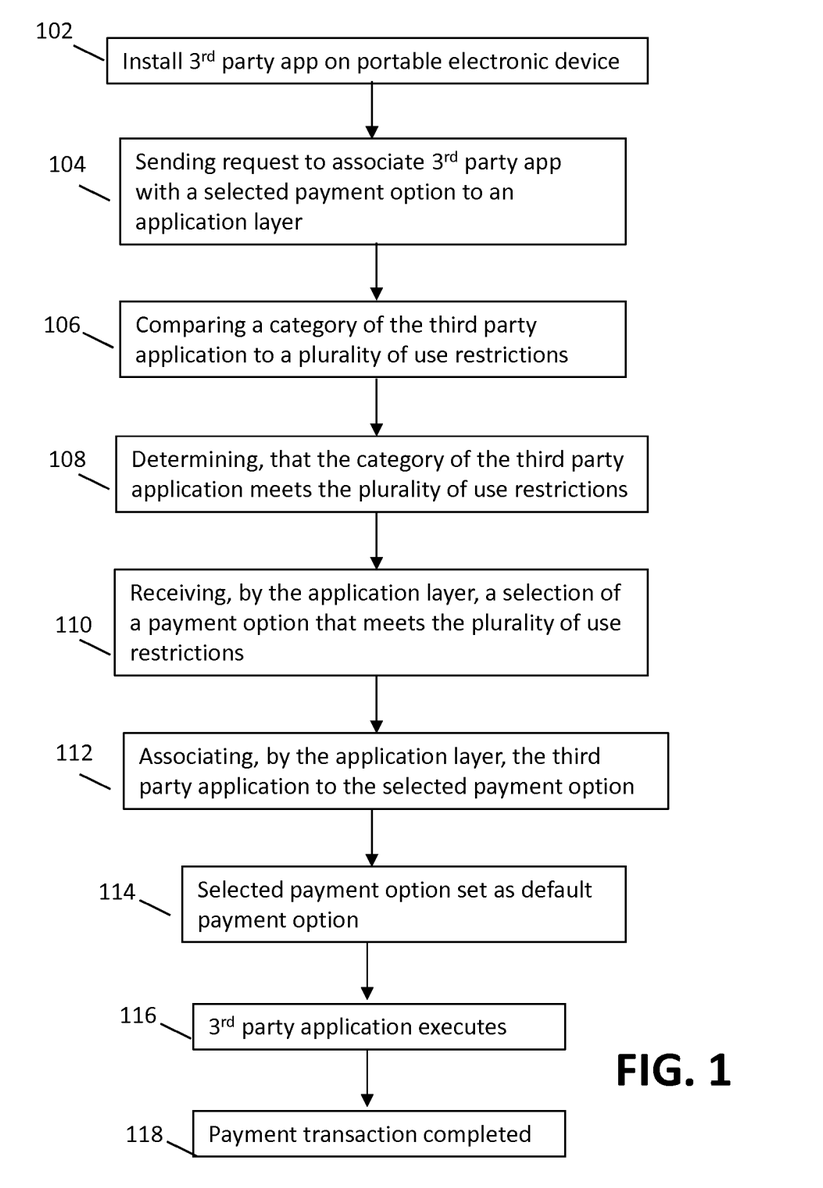
FIG. 1 is a flowchart of an embodiment of completing a payment transaction using payment options stored on a mobile device.

FIG. 1 is a flowchart of an embodiment of completing a payment transaction using payment options stored on a mobile device. In an embodiment, the user of a portable electronic device installs a third party application on their portable electronic device (PED) at block 102. The third part application is designed, commissioned, or purchased by a third party vendor such as a vendor of food and beverage, beverage-only, clothing, shoes, and apparel, sporting goods, electronics, fees, memberships, and subscriptions, groceries, events, and gaming. The third party application may be triggered or opened by events such as arrival at the vendor for whom that application is used, or if a user makes a purchase using that application remotely, or if a user sets up an automatic pay option on a monthly, weekly, or annual basis for a subscription or membership. In another example, the third party application may be triggered when a user presses an icon on the screen for payment, gives an audible indication for payment, or when the device is placed in proximity of a point-of-sale (POS) terminal.

When the third party application is triggered and a request for payment is made, a request is sent at block 104 for a selected payment option to be used for the purchase, that is, for the selected payment option to be associated with the third party application. This request at block 104 is sent through an application layer which acts as a buffer or gatekeeper between the third party application and the secure element on the portable electronic device so that the third party application does not directly communicate with the secure element. The application layer compares a category of the third party application to a plurality of use restrictions at block 106. The category may be, for example, food and beverage, beverage-only, groceries, sporting goods, or electronics. The plurality of use restrictions at block 106 is defined by the issuer of the selected payment option. The issuer of the selected payment option may be, for example, a financial institution, a company affiliated with a financial institution, or a vendor of goods or services. The plurality of use restrictions defines the parameters of use for a particular payment option. One type of use restriction may be the category of the third party application which may be one of food and beverage, beverage-only, clothing, shoes, and apparel, sporting goods, electronics, fees, memberships, and subscriptions, groceries, events, gaming, age-restricted activities, and location-restricted activities. The use restrictions are defined by the issuer of the selected payment option, and if multiple payment options are stored on the secure element, each payment option or category of payment option may have its own plurality of use restrictions, or an issuer, such as a financial institution, may have one set of use restrictions for all payment options.

The categories of payment options may comprise a credit card, debit card, pre-paid one-time use or refillable card, and checking or savings account. In some embodiments, a vendor may have issued their own form of credit card which may also be used. Additional types of use restrictions may be age of the user, the location of the user, the type of card being used, for example, a pre-paid card may not be able to be used for a subscription payment. In one example, a transaction may not be completed, that is, may not be allowed by the plurality of use restrictions because the use restrictions prohibit a transaction at a casino (gaming category) or at an adult-themed establishment. In another example, a transaction may not be allowed because of a combination of restrictions, for example, a pre-paid card for minors that is selected for use as a payment option at a bar (beverage-only, age-restricted) or casino (gaming, age-restricted).

Figure 2:
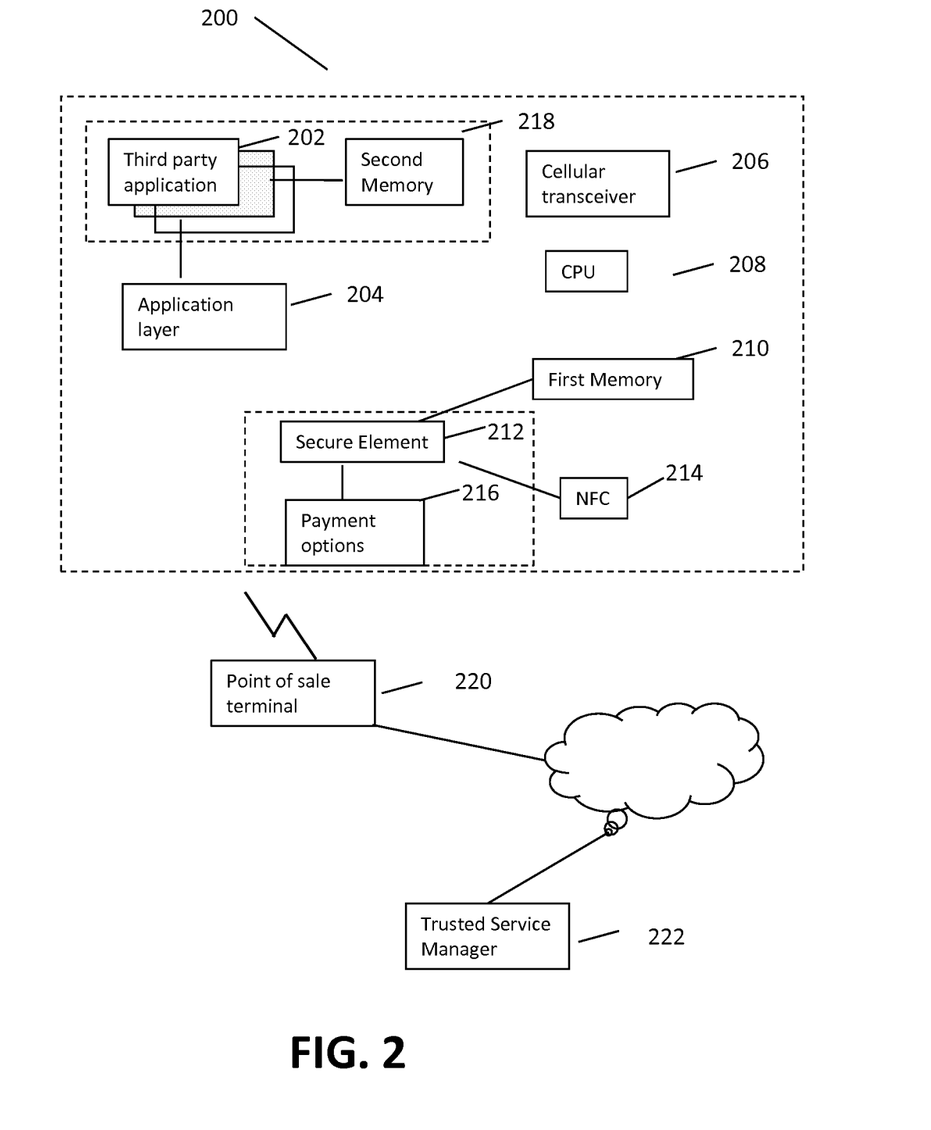
FIG. 2 is an illustration of an embodiment of a system used to complete a payment transaction using payment options stored on a mobile device.

At block 108, a determination is made by the application layer that the third party application meets the plurality of use restrictions which then allows the application layer to receive the selected payment option information from the secure layer at block 110. Once the payment option is received by the application layer at block 110, the application layer associates the selected payment option with the third party application at block 112. The selected payment option is then set as the default payment option in the secure element at block 114. The third party application executes at block 116 and the payment transaction is completed at block 118. Completing the payment transaction at block 118 comprises retrieving payment option credentials from the secure element and transmitting the payment option credentials from the portable electronic device to the point of sale terminal as shown in FIG. 2 at block 220 via NFC. In an embodiment (not pictured), the secure element or the application, or both, store a user profile. The user profile may comprise one of a name, address, social security number, customer number, phone number, fax number, email, work contact information, purchase history, social media contacts, and frequent buyer or flier information. In this embodiment, the associating further comprises comparing the user profile to a profile associated with the selected payment option.

FIG. 2 is an illustration of a system for completing a payment transaction. Portable electronic device 200 comprises a near field communication transmitter at block 214, a cellular transceiver at block 206 and a CPU at block 208. A first non-transitory memory 210 is stored in a user partition (not pictured), and a secure element at block 212 stores a plurality of payment options at block 216. A plurality of third party applications at block 202 may be stored in a second non-transitory memory 218 may be stored in a user partition (not pictured). A secure element application layer at block 204 may be stored in the second non-transitory memory at block 218 as well. The application layer 204 acts as a buffer between third party applications and the secure element 212 when the portable electronic device 200 is in communication with a point of sale terminal 220. In addition, the third party applications are specific to the vendor or parent company of a vendor of goods or services. It is appreciated that the transaction may actually be completed by a payment processor or go through a trusted service manager 222 as discussed in detail below. For example, if a department store that sells a variety of apparel as well as home goods and accessories has an application, a coffee chain cannot access that application to allow you to purchase a coffee bundle through the department store that contains some of that chain's coffee. The only party who can access the application layer through the third party application is the owner of that application.

When the secure element application layer at block 204, which may also be referred to as a secure element integration layer application, is executed by a processor (not pictured) the secure element at block 212 receives a request for integration with a payment option from the plurality of payment options at block 216. At least one payment option at block 216 stored in the secure element at block 212 is authorized for use with a category, which may also be referred to as a business category, associated with a third party application at block 202. The authorized payment option could have been previously authorized, set as a default or preferred payment option, or newly added or selected. The authorized payment option is provided to the third party application at block 202 in response to the request for integration. The selected payment option is received and integrated with the third party application at block 202 that made the request where integration comprises storing an association between the one payment option at block 216 and the third party application at block 202.

Figure 3A:
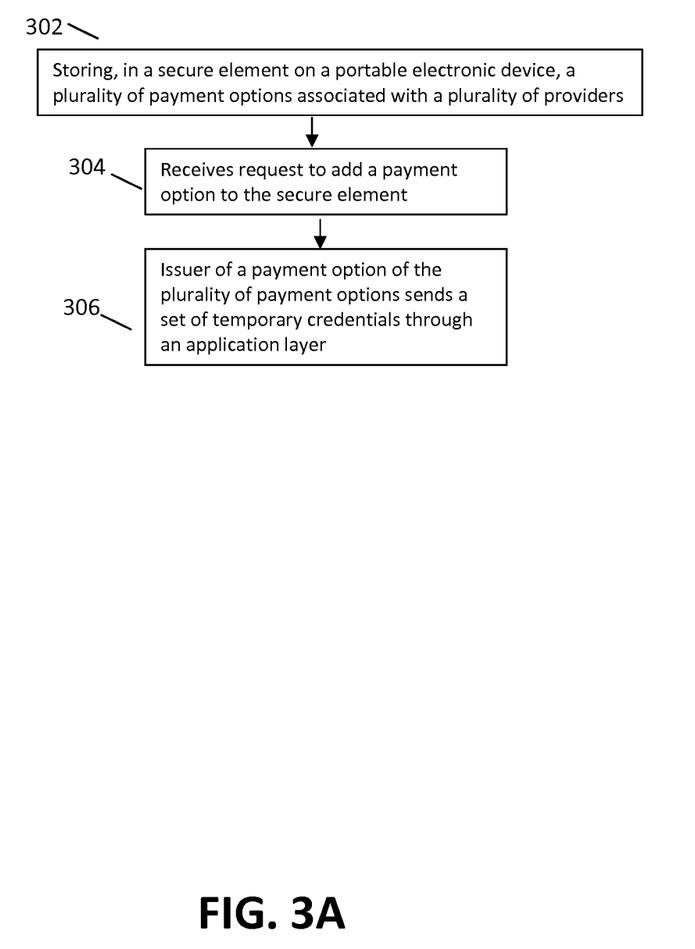
FIG. 3A is a flowchart of an embodiment of storing a plurality of payment options on a secure element.

FIG. 3A is a flowchart of an embodiment of a method of storing a plurality of payment options on a secure element. At block 302, a plurality of payment options are stored on a portable electronic device. The plurality of payment options may be associated with a plurality of providers or issuers. The issuer of a selected payment option receives a request at block 304 to add a payment to the secure element. At block 306, the issuer of a payment option of the plurality of payment options sends a set of temporary credentials through an application layer so that the selected payment option can be added to the secure element. A plurality of payment options may be stored on the secure element through this method because the temporary credentials or "keys" to the secure element are, as the name suggests, temporary, allowing the transfer of payment information including the payment option designation number, issuer, and profile information associated with the payment option on to the secure element. In addition, the use restrictions may be transferred during this process.

Figure 3B:
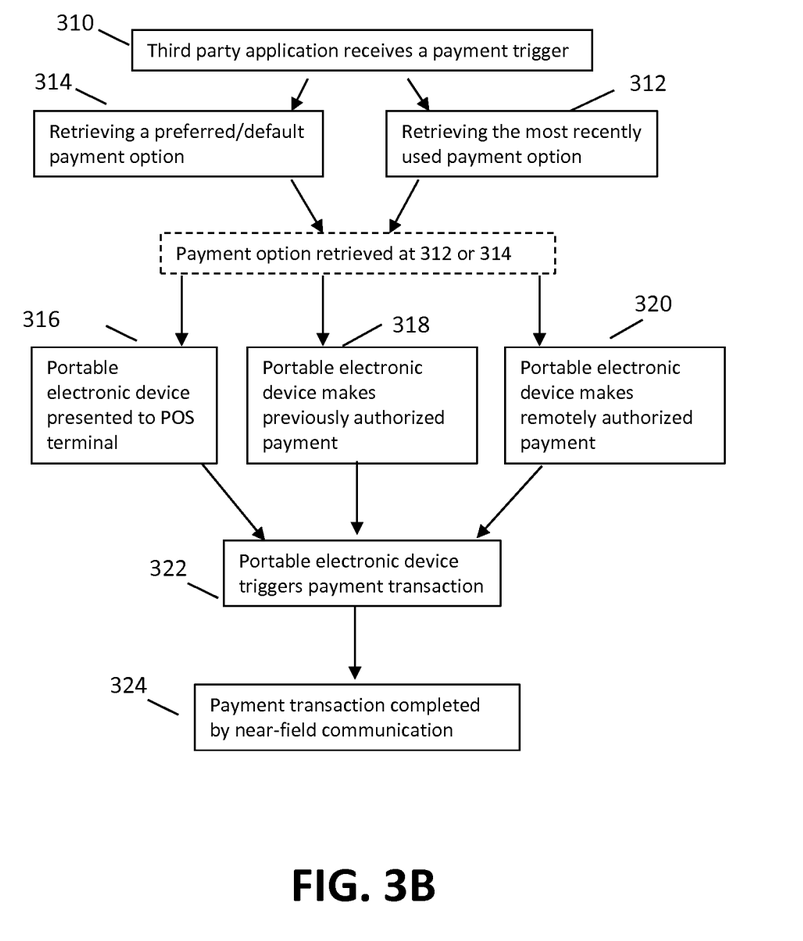
FIG. 3B is a flowchart of an alternate embodiment of completing a payment transaction using payment options stored on a mobile device.

FIG. 3B is a flowchart of an alternate embodiment of a method of completing a payment transaction. In this embodiment, payment options have been stored on the phone, for example, in accordance with FIG. 3A, and the third party application has been previously used and installed. At block 310, a third party application receives a payment trigger. In an embodiment, this payment trigger may be received by manual input by the user, by a POS terminal, a remote trigger from a transaction completed in whole or in part on the portable electronic device, or from a previously established subscription or membership payment to be made on a daily, weekly, bi-weekly, monthly, bi-annually, yearly, or other basis based on an interval of time or an account balance. In the case that a previously established membership or subscription payment is due, an alert may come up on the portable electronic device to confirm that a payment should be made or to confirm that a payment has been made. In the event that a previously established payment method is no longer valid or active, the third party application will communicate as such to the portable electronic device.

At block 312, the third party application retrieves the most recently used payment option for that third party application. Alternatively at block 314, the third party application retrieves a default or preferred payment option that was previously set by the user or by the third party application. The default or preferred payment option may have been set by a method similar to what is disclosed above in FIG. 1 using a plurality of use restrictions from an issuer of a payment option. When the payment option is retrieved by the third party application at either block 312 or 314, the portable electronic device is presented to a POS terminal at block 316. In an alternate embodiment at block 318, the portable electronic device makes a payment based on a pre-determined schedule. This may be, for example, a subscription, a membership, or any other good or service such as layaway that may result in a periodic payment. In this embodiment, a payment or a plurality of payments is authorized at the initial transaction and subsequent payments may ask for further authorization by the user of the portable electronic device but may not ask for the selection of a new payment option. In yet another embodiment at block 320, the portable electronic device makes a remotely authorized payment. A remotely authorized payment may refer to a payment made online through the third party application, i.e. a payment made while the portable electronic device is in communication with a POS but not necessarily in the physical presence of that POS. Regardless of whether the payment is made at block 316, 318, or 320, the portable device triggers the payment transaction at block 322 and the payment transaction is completed by near-field communication at block 324.

Figure 4:
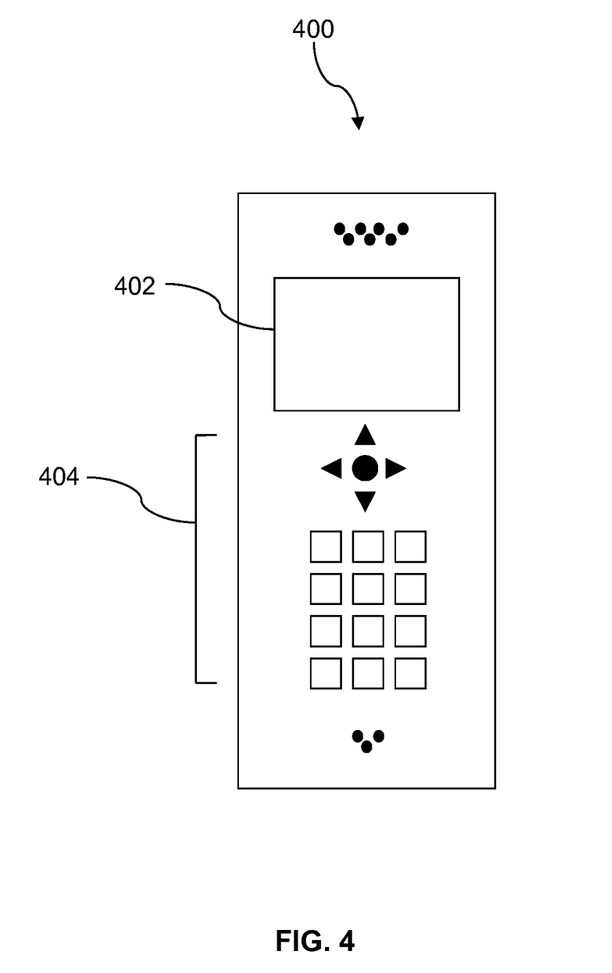
FIG. 4 is an illustration of a portable electronic device.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
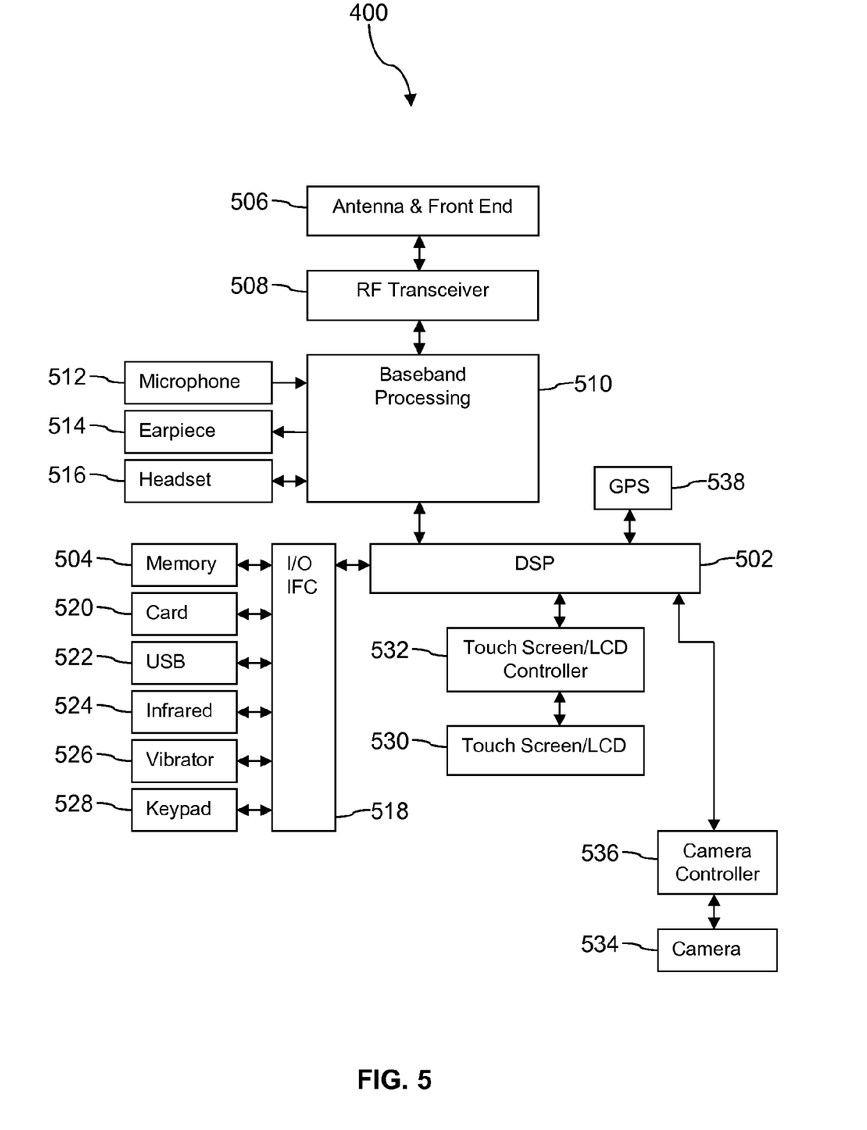
FIG. 5 is a block diagram of a portable electronic device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
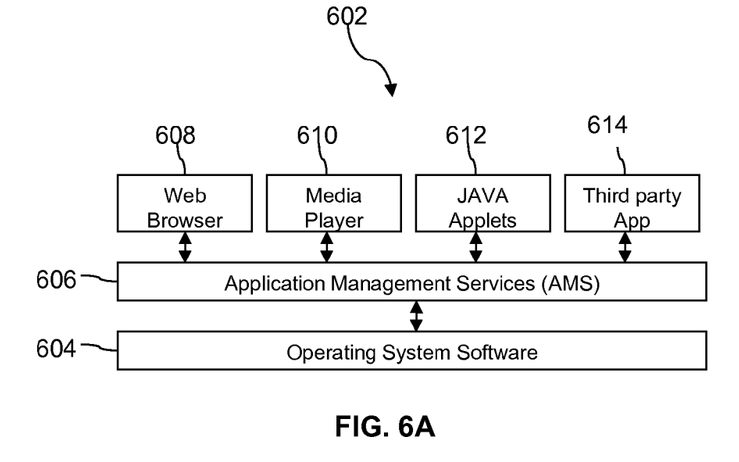
FIG. 6A is a block diagram of a software architecture of a portable electronic device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The third party application(s) at block 614 may be stored on mobile device 400 by steps 302, 304, and 306 in FIG. 3A.

Figure 6B:
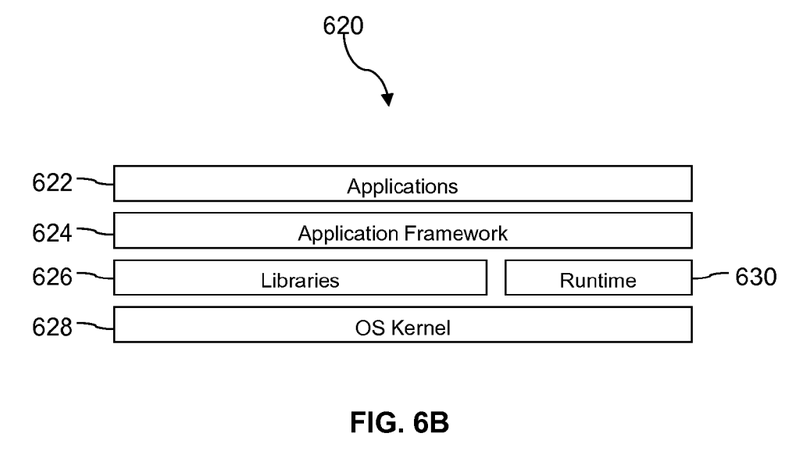
FIG. 6B is a block diagram of another software architecture of a portable electronic device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of using a portable electronic device to make a payment by near field communication using a selected payment option, comprising:
    installing a third party application on a portable electronic device in a user memory partition;
    sending, to an application layer of the portable electronic device, a request to associate the third party application with a payment option stored on a secure element on the portable electronic device, wherein the secure element is a portion of a second memory partition on the portable electronic device, and wherein the application layer isolates the third party application in the user memory partition from the secure element in the second memory partition and acts as a buffer or gatekeeper between the third party application and the secure element such that the third party application is not in direct communication with the secure element;
    comparing, by the application layer, a category of the third party application to a plurality of use restrictions defined by an issuer of the payment option, wherein the plurality of use restrictions comprise a category of a transaction;
    determining, by the application layer, based on the comparison, that the category of the third party application meets the plurality of use restrictions;
    receiving, by the application layer, a selection of the payment option from the third party application based on the determination that the category of the third party application meets the plurality of use restrictions;
    associating, by the application layer, the selected payment option to the third party application as a default payment option, wherein the third party application executes after the association has been established and after the selected payment option is configured by the application layer as the default payment option for the third party application; and
    subsequent to the associating, communicating the default payment option to a point-of sale terminal via a near-field-communication to make a payment.

2. The method of claim 1, wherein the category of the transaction comprises one of food and beverage, beverage-only, clothing, shoes, and apparel, sporting goods, electronics, fees, memberships, and subscriptions, groceries, events, gaming, age-restricted activities, and location-restricted activities.

3. The method of claim 1, wherein the type of the transaction is one of an in-person transaction, a scheduled transaction, and a digital transaction.

4. The method of claim 1, further comprising storing, in the secure element or in the application, a user profile, wherein the user profile comprises one of a name, address, social security number, customer number, phone number, fax number, email, and social media contacts.

5. The method of claim 4, wherein associating further comprises comparing the user profile to a profile associated with a payment option.

6. The method of claim 1, wherein the third party application is a third party vendor application, and wherein the third party vendor application is designed, commissioned, or purchased by a third party vendor and is used by a user of the portable electronic device to make one or more purchases from the third party vendor.

7. A portable electronic device comprising:
    a near field communication transmitter;
    a secure element stored in a first non-transitory memory and comprising a plurality of payment options;
    a second non-transitory memory;
    a processor;
    a third party application stored in a user partition of the second non-transitory memory; and
    a secure element application layer stored in the second non-transitory memory that, when executed by the processor:
        receives, from the third party application, a request for integration with a payment option stored in the secure element in the first non-transitory memory of the electronic device, wherein the secure element application layer isolates the third party application in the user partition of the second non-transitory memory from the secure element and acts as a buffer or gatekeeper between the third party application and the secure element such that the third party application is not in direct communication with the secure element;
        identifies at least one payment option stored in the secure element of the first non-transitory memory that is authorized by the issuer of the at least one payment option for use with a business category associated with the third party application;

provides the at least one payment option to the third party application in response to the request for integration;

receives a selection of the at least one payment option; and integrates the third party application with the selected at least one payment option, where integration comprises storing an association between the selected at least one payment option and the third party application, wherein, subsequent to storing the association, the default payment option is communicated to a point-of sale terminal via a near-field-communication to make a payment.

8. The portable electronic device of claim 7, wherein the portable electronic device is one of a personal digital assistant (PDA), a tablet, a laptop computer, or a cellular phone.

9. The portable electronic device of claim 7, wherein the at least one payment option is one of a credit card issued by a financial institution, a debit card issued by a financial institution, or a vendor-issued credit card.

10. The portable electronic device of claim 7, wherein the at least one payment option is one of a checking account, and a savings account.

11. The portable electronic device of claim 7, wherein the business category of the transaction comprises one of food and beverage, beverage-only, clothing, shoes, and apparel, sporting goods, electronics, fees, memberships, and subscriptions, groceries, events, gaming, age-restricted activities, and location-restricted activities.

12. A method of utilizing multiple payment options stored on a portable electronic device comprising:

storing, in a secure element in a first non-transitory memory on a portable electronic device, a plurality of payment options associated with a plurality of providers, wherein storing the plurality of payment options comprises an issuer of a payment option of the plurality of payment options sending a set of temporary credentials through an application layer in response to a request to add a payment option to the secure element;

installing, on a second non-transitory memory of the portable electronic device, a third party application;

sending, to an application layer of the portable electronic device, a request to associate the third party application in the second non-transitory memory with a default payment option of the plurality of payment options stored on the secure element in the first non-transitory memory, wherein the default payment option is integrated with the third party application in response to a category of the third party application satisfying one or more card issuer rules of the default payment option, and wherein the application layer isolates the third party application from the secure element and acts as a buffer or gatekeeper between the third party application and the secure element such that the third party application is not in direct communication with the secure element; and retrieving, in response to receiving a payment trigger, at least one of a most recently used payment option and the default payment option to make a payment, wherein the default payment option is based upon the association, and wherein the payment is made based on the association by a near-field-communication payment transaction triggered by the portable electronic device at a point-of-sale terminal.

13. The method of claim 12, wherein the payment trigger is one of an input received and a previously-authorized payment.

14. The method of claim 12, wherein the plurality of payment options are at least one of a credit card, a debit card, a pre-paid card, a checking account, or a savings account.

15. The method of claim 12, wherein the third party application is a first vendor's application.

16. The method of claim 15, wherein the third party application cannot be accessed by a second vendor's application to make the payment.

17. The method of claim 12, wherein the payment trigger is received when the portable electronic device is presented to the point-of-sale terminal.

18. The method of claim 12, wherein the payment trigger is received based on a pre-determined schedule.

19. The method of claim 12, wherein the payment trigger is received from the third party application.

20. The method of claim 12, wherein the portable electronic device is one of a personal digital assistant (PDA), a tablet, a laptop computer, or a cellular phone.

* * * * *